United States Patent
Liao et al.

(10) Patent No.: US 9,710,580 B2
(45) Date of Patent: Jul. 18, 2017

(54) TIMING ANALYSIS METHOD FOR DIGITAL CIRCUIT DESIGN AND SYSTEM THEREOF

(71) Applicants: Global Unichip Corporation, Hsinchu (TW); Taiwan Semiconductor Manufacturing Co., Ltd., Hsin-Chu (TW)

(72) Inventors: Teng-Nan Liao, Hsinchu (TW); Te-Hsun Fu, Hsinchu (TW); Hsin-Hsiung Liao, Hsinchu (TW); Cheng-Hong Tsai, Hsinchu (TW); Min-Hsiu Tsai, Hsinchu (TW)

(73) Assignees: Global Unichip Corporation, Hsinchu (TW); Taiwan Semiconductor Manufacturing Co., Ltd., Hsinchu (TW)

( * ) Notice: Subject to any disclaimer, the term of this patent is extended or adjusted under 35 U.S.C. 154(b) by 160 days.

(21) Appl. No.: 14/791,495

(22) Filed: Jul. 6, 2015

(65) Prior Publication Data

US 2017/0011161 A1    Jan. 12, 2017

(51) Int. Cl.
G06F 17/50    (2006.01)

(52) U.S. Cl.
CPC ...... *G06F 17/5031* (2013.01); *G06F 17/5059* (2013.01); *G06F 17/5027* (2013.01); *G06F 2217/84* (2013.01)

(58) Field of Classification Search
CPC ............ G06F 17/5009; G06F 17/5027; G06F 17/5045; G06F 17/5059; G06F 17/5031; G06F 2217/84

USPC .......................................... 320/106, 108, 113
See application file for complete search history.

(56) References Cited

U.S. PATENT DOCUMENTS

| | | |
|---|---|---|
| 7,406,669 B2 | 7/2008 | Lindberg |
| 7,480,881 B2 | 1/2009 | Tetelbaum et al. |
| 7,490,307 B2 | 2/2009 | Fomaciari et al. |
| 7,669,155 B2 | 2/2010 | Ganesan et al. |
| 7,791,381 B2 | 9/2010 | Ohyabu |
| 7,926,019 B1 | 4/2011 | Ravi |
| 8,205,178 B2 | 6/2012 | Ravi |
| 8,341,573 B2 | 12/2012 | Rao et al. |
| 8,413,095 B1 | 4/2013 | Dubuque et al. |
| 8,522,179 B1 | 8/2013 | Griesbach et al. |

(Continued)

FOREIGN PATENT DOCUMENTS

| | | |
|---|---|---|
| TW | 200527237 | 8/2005 |
| TW | 200849051 | 12/2008 |

*Primary Examiner* — Paul Dinh
(74) *Attorney, Agent, or Firm* — Jianq Chyun IP Office

(57) ABSTRACT

A timing analysis method for a digital circuit design, a system and a computer readable storage media thereof are provided. The timing analysis method includes following steps. An integrated circuit (IC) design is obtained, wherein the IC is operated in a plurality of operating modes. A plurality of extracted timing models (ETMs) are respectively generated according to the operating modes of the IC design, wherein each of the ETMs includes a none on-chip variation (NOCV) part and an on-chip variation (OCV) part. The ETMs corresponding to the operating modes are integrated into a NOCV ETM and an OCV ETM, wherein the OCV part of the operating modes is not considered when the NOCV ETM is generated. And, a timing checking of the IC design is analyzed according to the NOCV ETM and the OCV ETM.

15 Claims, 3 Drawing Sheets

(56) References Cited

U.S. PATENT DOCUMENTS

| | | |
|---|---|---|
| 8,539,423 B2 | 9/2013 | Jamann et al. |
| 8,543,951 B2 | 9/2013 | Rao et al. |
| 8,701,074 B2 | 4/2014 | Sripada et al. |
| 8,762,908 B1 | 6/2014 | Chang et al. |
| 8,875,082 B1 * | 10/2014 | Sircar ................. G06F 17/5068 716/110 |

* cited by examiner

TIMING ANALYSIS METHOD FOR DIGITAL CIRCUIT DESIGN AND SYSTEM THEREOF

BACKGROUND

Technical Field

The invention relates to an analysis and simulation technique for a digital integrated circuit (IC) design, and particularly relates to a timing analysis method for a digital circuit design and a system thereof.

Related Art

In order to simplify design complexity of a digital circuit, a user can use a digital circuit design program and a library model built therein to design the required circuit, and perform circuit function verification on the digital circuit design, so as to determine whether the digital circuit design can successfully satisfy the user's functional requirements. Since implementation of the circuit structure is required to consider a plenty of electronic circuit and electromagnetic properties, for example, consider a layout position of each of the components in the circuit, an influence of a circuit length on signal, timing and power transmission, etc., an auto-place-route (APR) tool is used for subsequent circuit-related implementation and verification.

In order to perform timing analysis for each of the digital circuit designs, timing parameters related to the delay and timing checking are obtained in a gate-level for each of the digital circuit designs according to a circuit structure and variation thereof in a signal simulation method, and these timing parameters may construct a plurality of timing arcs. In this way, the APR tool can analyse a timing model of the circuit design according to the timing arcs without learning a whole circuit structure and component positions. Collection information of the specific timing parameters is referred to as an extracted timing model (ETM). A source of the aforementioned variation may include manufacturing variation, device fatigue, environment variation, phase locked loop (PLL) variation, etc. However, regardless of the type of the variation, the sources of the variation may obviously increase difficulty in analysis and simulation of the digital circuit design, such that these variations have to be accurately counted during the timing analysis.

In the past, a generation flow of the ETM is to produce a different ETM for each operating mode in each circuit design (for example, a single intellectual property (IP) design component), and perform supplement and derating to each of the ETMs according to an on-chip variation thereof, such that each circuit design probably corresponds to a plurality of ETMs. Since the APR tool has to consider whether the timing checking of the circuit design satisfies the user's requirement during a built-in self-test (BIST) phase or a function verification phase, the ETM under each operating mode has to be provided to the APR tool for reference. However, the currently known APR tool cannot read all of the ETMs in a single circuit design, and can only take the firstly-read ETM as a reference of the circuit design, and cannot consider the timing information in the other ETMs. In other words, the current APR tool cannot completely analyze the timing information of all of the ETMs in the single circuit design.

Therefore, how to make the APR tool to successfully perform circuit analysis according to a plurality of the ETMs corresponding to different operating modes of the single circuit design is always a problem in the digital circuit design technique.

SUMMARY

The invention is directed to a timing analysis method for a digital circuit design and a system thereof, in which by integrating a plurality of extracted timing models (ETMs) corresponding to a plurality of operating modes in a single circuit design, a number of timing models read by a post-end auto-place-route (APR) tool is greatly decreased, so as to increase efficiency and accuracy of the APR tool in static timing analysis.

The invention provides a timing analysis method for a digital circuit design, which includes following steps. An integrated circuit (IC) design is obtained, where the IC design is operated in a plurality of operating modes. A plurality of extracted timing models (ETMs) are respectively generated according to the operating modes of the IC design, where each of the ETMs includes a none on-chip variation (NOCV) part and an on-chip variation (OCV) part. The ETMs corresponding to the operating modes are integrated into a NOCV ETM and an OCV ETM, where the OCV part of the operating modes is not considered when the NOCV ETM is generated. A timing checking of the IC design is simulated according to the NOCV ETM and the OCV ETM.

In an embodiment of the invention, the NOCV part includes a logic gate delay analysis information set and timing arc verification information set. The OCV part includes a chip setup derating information and a chip hold derating information. The logic gate delay analysis information set includes at least one combinational cell delay message, at least one sequential cell delay message and a pulse width message. The logic gate delay analysis information set and the timing arc verification information set do not include a signal setup margin factor and a signal hold margin factor related to an on-chip variation.

In an embodiment of the invention, the chip setup derating information includes a chip setup margin message to consider the on-chip variation. The chip hold derating information includes a chip hold margin message to consider the on-chip variation. The chip setup margin message and the chip hold margin message respectively use different on-chip variation derating factors to implement supplement and derating of the on-chip variation.

In an embodiment of the invention, the step of respectively generating the ETMs includes following steps. When the NOCV ETM is generated, the chip setup derating information and the chip hold derating information are not considered.

In an embodiment of the invention, the step of respectively generating the ETMs includes generating the ETMs by adopting a global on-chip variation supplement derating technique.

In an embodiment of the invention, the step of simulating the timing checking of the IC design includes following steps. The none on-chip variation extracted timing model and the on-chip variation extracted timing model are loaded to an APR tool to perform a static timing analysis process.

In an embodiment of the invention, the step of simulating the timing checking of the IC design includes following steps. A signal setup margin factor and a signal hold margin factor related to the on-chip variation are loaded to the APR tool to perform the static timing analysis process.

In an embodiment of the invention, all of the ETMs are generated by adopting a same library corner.

According to another aspect, the invention provides a timing analysis system for a digital circuit design, which is adapted to a computer device. The timing analysis system includes a transmission module, a timing extraction module, a timing model integration module and a timing analysis module. The transmission module is configured to receive an integrated circuit (IC) design, where the IC design is operated in a plurality of operating modes. The timing extraction module is configured to respectively generate a plurality of extracted timing models (ETMs) according to the operating modes of the IC design, where each of the ETMs includes a none on-chip variation (NOCV) part and an on-chip variation (OCV) part. The timing model integration module is configured to integrate the ETMs corresponding to the operating modes into a NOCV ETM and an OCV ETM, where the OCV part of the operating modes is not considered when the NOCV ETM is generated. The timing analysis module simulates a timing checking of the IC design according to the NOCV ETM and the OCV ETM.

Referring to the aforementioned descriptions for other implementation details of the timing analysis system for the digital circuit design, and details thereof are not repeated.

According to another aspect, the invention provides a computer readable storage media, which is configured to store a computer program, and the computer program is loaded to a computer system to execute the aforementioned timing analysis method for the digital circuit design.

According to the above descriptions, a plurality of the ETMs corresponding to a plurality of operating modes in a single digital circuit design are integrated to form two special ETMs (i.e. the NOCV ETM and the OCV ETM), and the two ETMs are loaded to the APR tool for subsequent static timing analysis. Particularly, a setting message of a chip signal is considered in the NOCV ETM, and margin variation factors related to the on-chip variation are not considered in the NOCV ETM, such that the timing arc of each operating mode in the digital circuit design can be completely presented in the static timing analysis of the APR tool through the NOCV ETM and the OCV ETM. In other words, according to the embodiment of the invention, the number of the timing models read by the post end APR tool is greatly decreased, and efficiency of the APR tool in the static timing analysis is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Extracted timing model (ETM) is a timing model and a liberty file generated from a gate-level netlist of a chip. The ETM has the same timing behavior as the netlist of the chip, and the data size of the ETM is much smaller than the data size of the netlist, and the ETM may be used in place of the netlist in a hierarchical timing analysis. Arc delays of the ETM have various arc types in the ETM, and the arc delays vary with input transition and output load of the netlist. The ETM is generated by using STA analysis tool according to the netlist for blocks, third($3^{rd}$) party library and other constraints, where the STA analysis tool only extracts the timing of the interface logic. Generally speaking, the netlist normally has a sequential circuit and a combinational circuit. For ETM, the sequential circuit has timing checking between input data port and clock pin (such as, setup, hold, clock gating setup, clock gating hold, recovery and removal) and delay from clock pin to output data port (such as, minimum sequential delay and maximum sequential delay). For ETM, the combinational circuit has the delay from input port to output port (such as, minimum combinational delay and maximum combinational delay).

In the past, generating extracted timing models (ETMs) of a digital circuit design has to consider the none on-chip variation and on-chip variation. For on-chip variation, setup and hold derating factors can be different. So, there are at least three ETMs, NOCV ETM, OCV SETUP ETM and OCV HOLD ETM, for each operation mode. As the operating modes increase, more ETMs are generated. When APR tool reads all ETMs, APR tool can't completely analyze the timing information of all ETMs in the single circuit design.

Figure 1:
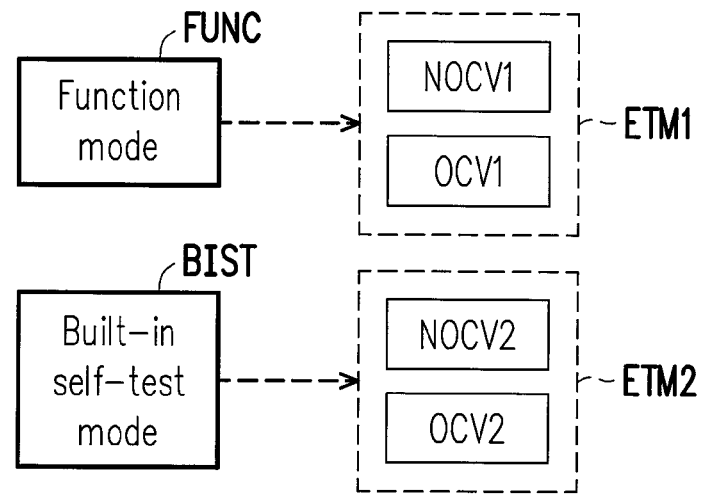
FIG. 1 is a schematic diagram of a digital circuit design having different operating modes and corresponding ETMs.

On the other hand, most of current circuits have a plurality of operating modes according to a design requirement. For example, FIG. 1 is a schematic diagram of a digital circuit design having different operating modes and corresponding ETMs. A digital circuit generally has a function mode FUNC for normal operation and a built-in self-test (BIST) mode required in a chip testing phase or a verification phase. In other embodiments, the digital circuit may also have a plurality of operating modes according to an actual requirement. Data paths of the aforementioned operating modes are mutually different due to different functions thereof, such that the ETMs of the of the same digital circuit design are quite different in different operating modes. For example, a first ETM ETM1 is generated corresponding to the function mode FUNC of the digital circuit, and the first ETM ETM1 is composed of a first none on-chip variation (NOCV) part NOCV1 and a first on-chip variation (OCV) part OCV1; a second ETM ETM2 is generated corresponding to the BIST mode BIST of the digital circuit, and the second ETM ETM2 is composed of a second NOCV part NOCV2 and a second OCV part OCV2. During timing analysis, an auto-place-route (APR) tool may take each of the ETMs ETM1 and ETM2 of different operating modes as different digital circuits for analysis, which results in a fact that the current APR tool cannot read all of and complete ETMs of the single digital circuit under different operating modes. It should be noted that, the function mode FUNC and the BIST mode of the digital circuit are taken as examples in the present embodiment of the invention. In another embodiments of the invention, the ETMs may be generated by the SCAN mode, JTAG mode and/or IP mode of the digital circuit.

Figure 2:
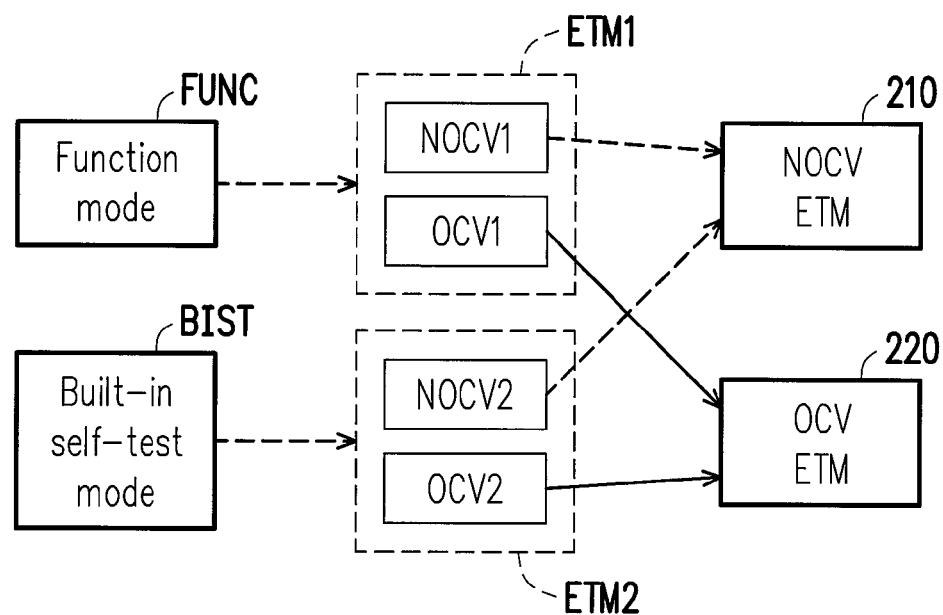
FIG. 2 is a schematic diagram of a digital circuit design having different operating modes and corresponding ETMs according to an embodiment of the invention.

In the present embodiment of the invention, a plurality of the ETMs corresponding to a plurality of the operating modes in the single circuit design are integrated into two special ETMs (i.e. a NOCV ETM 210 and an OCV ETM 220), and the two ETMs are loaded to the APR tool to implement subsequent static timing analysis. FIG. 2 is a schematic diagram of a digital circuit design having different operating modes and corresponding ETMs according to an embodiment of the invention. A difference between the embodiments of FIG. 1 and FIG. 2 is that the first NOCV part NOCV1 and the second NOCV part NOCV2 are integrated to form a special NOCV ETM 210, and the first OCV part OCV1 and the second OCV part OCV2 are integrated to form a special OCV ETM 220. It should be noticed that, setting message of a chip signal is considered in the NOCV ETM 210, and margin variation factors related to on-chip variation are not considered in the NOCV ETM 210. In this way, a timing arc of each operating mode in the digital circuit design can be completely presented in the static timing analysis of the APR tool through the two NOCV ETM 210 and the OCV ETM 220. On the other hand, the margin variation factors related to the on-chip variation can be additionally read by the APR tool to implement a detailed and complete static timing analysis process. Therefore, the number of the ETMs of the digital circuit design having a plurality of the operating modes can be decreased, and the operation of the static timing analysis process can be simplified. Embodiments are provided below for detailed descriptions.

Figure 3:
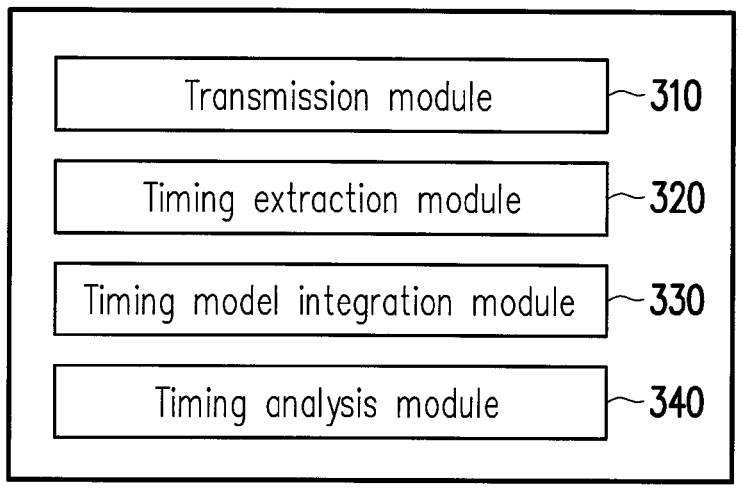
FIG. 3 is a block diagram of a timing analysis system for a digital circuit design according to an embodiment of the invention.
Figure 4:
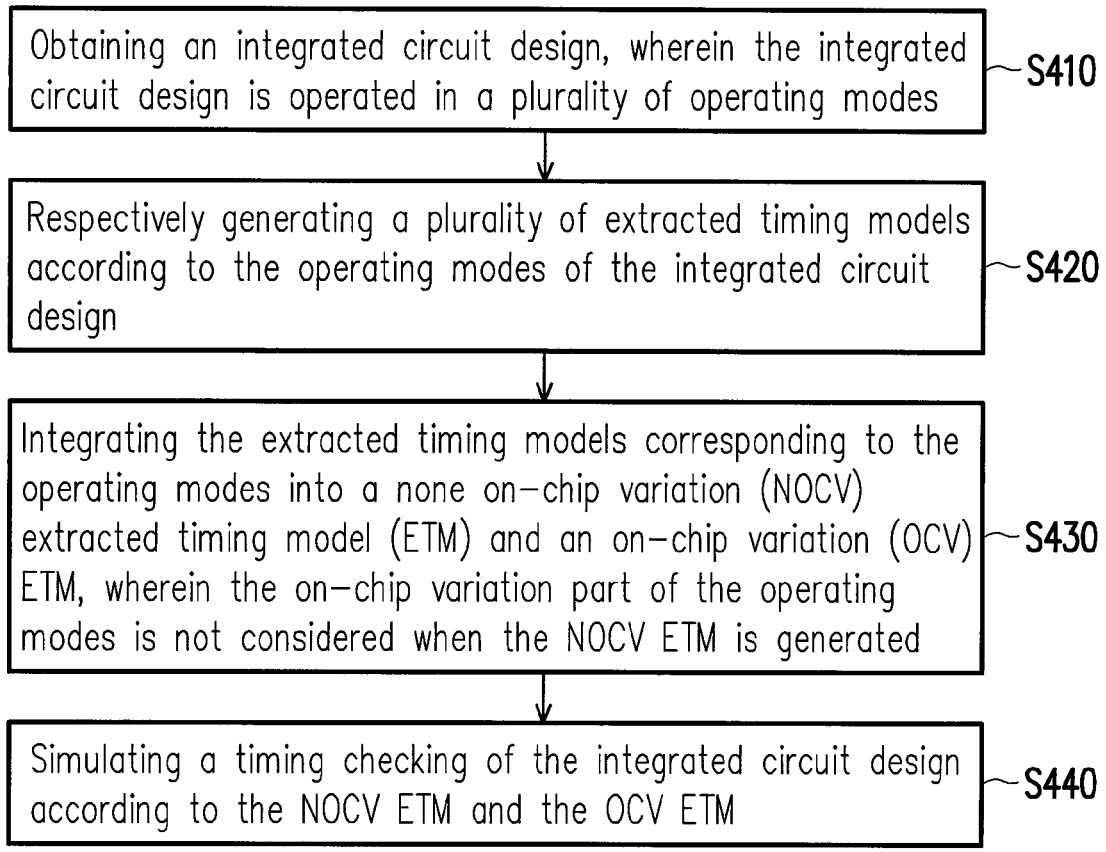
FIG. 4 is a flowchart illustrating a timing analysis method for a digital circuit design according to an embodiment of the invention.

FIG. 3 is a block diagram of a timing analysis system 300 for the digital circuit design according to an embodiment of the invention. FIG. 4 is a flowchart illustrating a timing analysis method for the digital circuit design according to an embodiment of the invention. The timing analysis method for the digital circuit design and the system thereof of the present embodiment of the invention are mainly adapted to a computer device. In other words, the timing analysis technique for the digital circuit design is implemented through a core processor, a memory and related hardware of the computer device. In the present embodiment, the timing analysis system 300 may include a transmission module 310, a timing extraction module 320, a timing model integration module 330 and a timing analysis module 340. The above modules 310-340 can be implemented by software composed of instructions, and can also be constructed by using one or a plurality of firmware or hardware processors.

Referring to FIG. 3 and FIG. 4, in step S410, the transmission module 310 is configured to receive an integrated circuit (IC) design. The IC design can be operated in a plurality of operating modes. In the present embodiment, the IC design can be a net-list file describing a configuration position of each of logic gates. The IC design can also be a circuit or composed of circuit elements in third($3^{rd}$) party intellectual property (IP) components. In step S420, the timing extraction module 320 is configured to respectively generate a plurality of ETMs according to the operating modes of the IC design. In other words, the timing extraction module 320 respectively generates the ETM corresponding to each of the operating modes of the IC design. As the number of the operating modes is increased, the corresponding number of the ETMs is increased. In the present embodiment, the ETMs are generated by adopting a same library corner.

Figure 5:
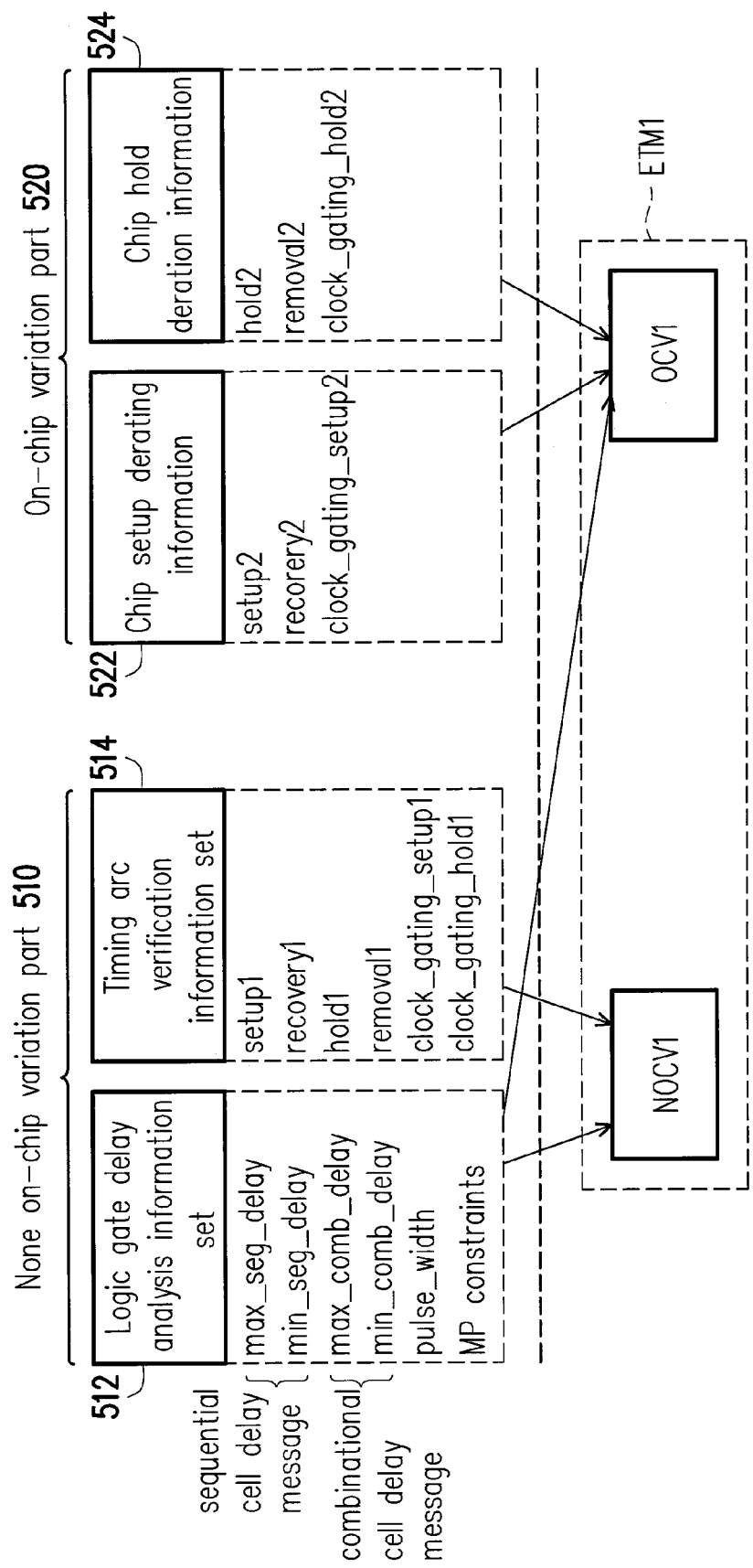
FIG. 5 is a schematic diagram of information sets in an ETM according to an embodiment of the invention.

The ETMs and information sets therein are described in detail below, and those skilled in the art can learn definitions of the ETMs and classification of the information sets according to following descriptions, though the embodiment of the invention is not limited thereto. FIG. 5 is a schematic diagram of information sets in an ETM according to an embodiment of the invention. In the present embodiment, each of the ETMs includes a none on-chip variation (NOCV) part 510 and an on-chip variation (OCV) part 520. The NOCV part 510 includes a logic gate delay analysis information set 512, a timing arc verification information set 514, and minimum period (MP) constraints. The messages in the logic gate delay analysis information set 512 are mainly messages generated based on gate delay of a logic gate, and the messages, for example, include at least one combinational cell delay message, at least one sequential cell delay message and a pulse width message. The at least one combinational cell delay message is, for example, used for describing a maximum combinational cell delay (max_comb_delay) message and a minimum combinational cell delay (min_comb_delay) message of a combinational circuit. The at least one sequential cell delay message is, for example, used for describing a maximum sequential cell delay (max_seg_delay) message and a minimum sequential cell delay (min_seg_delay) message of a sequential circuit. In detail, the max_comb_delay is a maximum delay arc information from the input port of the combinational circuit to the output port of the combinational circuit in the netlist, and the min_comb_delay is a minimum delay arc information from the input port of the combinational circuit to the output port of the combinational circuit in the netlist. The max_seg_delay is a maximum delay arc information from the clock pin of the sequential circuit to the output port in the netlist, and the min_seg_delay is a minimum delay arc information from the clock pin of the sequential circuit to the output port. The minimum period (MP) constraints are also defined for clock pins of the ETM.

The messages in the timing arc verification information set 514 includes messages, which includes a setup arc information setup1, a recovery arc information recovery1, a hold arc information hold1, a removal arc information removal1, a clock-gating setup arc information clock_gating_setup1, and a clock-gating hold arc information clock_gating_hold1. The setup arc information setup1, the recovery arc information recovery1, the hold arc information hold1, the removal arc information removal1, the clock-gating setup arc information clock_gating_setup1, and the clock-gating hold arc information clock_gating_hold1 are defined for the timing checking between primary input port connected to the sequential circuit and the clock pin of the sequential circuit in the net-list. The messages in the NOCV part 510 are not caused by the on-chip variation, but are probably caused by the logic gates of the circuit structure itself.

The messages in the OCV part 520 is generated due to a drift of a semiconductor manufacturing process that influences a part of the messages. For example, the OCV part 520 includes a chip setup derating information 522 and a chip hold derating information 524. Messages in the chip setup derating information 522 at least include a setup arc information setup2, a recovery arc information recovery2 and a clock-gating setup arc information clock_gating_setup2. The setup arc information setup2, the recovery arc information recovery2 and the clock-gating setup arc information clock_gating_setup2 are defined for the timing checking between primary input port connected to the sequential circuit and the clock pin of the sequential circuit in the net-list. Messages in the chip hold derating information 524 at least include a hold arc information hold2, a removal arc information removal2 and a clock-gating hold arc information clock_gating_hold2. The hold arc information hold2, the recovery arc information removal2 and the clock-gating hold arc information clock_gating_hold2 are defined for the timing checking between primary input port connected to the sequential circuit and the clock pin of the sequential circuit in the net-list.

However, in the present embodiment of the invention, in order to integrate the ETMs corresponding to different operating modes, the logic gate delay analysis information set 512 and the timing arc verification information set 514 of the invention are unnecessary to include the signal setup margin factor and the signal hold margin factor related to the on-chip variation. Comparatively, the chip setup derating information 522 may include the aforementioned chip input setting margin message to consider the on-chip variation, and the chip hold derating information 524 may also include the aforementioned chip hold margin message to consider the on-chip variation. The aforementioned chip setup derating information 522 and the 524 may respectively use different on-chip variation derating factors to implement supplement and derating of the on-chip variation.

Referring to FIG. 4 and FIG. 5, in step S430, the timing model integration module 330 of FIG. 3 integrates the ETMs corresponding to the operating modes of the digital circuit design and the information sets therein into the NOCV ETM 210 and the OCV ETM 220. It should be noticed that when the timing model integration module 330 generates the NOCV ETM 210, the OCV part 520 of the operating modes is not considered. In other words, generation of the NOCV ETM 210 mainly considers the logic gate delay analysis information set 512 and the timing arc verification information set 514 of the NOCV part 510 without considering the chip setup derating information 522 and the chip hold derating information 524, the signal setup margin factor and the signal hold margin factor generated due to the on-chip variation.

It should be noticed that in the present embodiment, the timing extraction module 320 and the timing model integration module 330 may adopt a global on-chip variation supplement derating technique to generate or integrate the ETMs other than integrating the ETMs during the static timing analysis.

In step S440, the timing analysis module 340 of FIG. 3 simulates a timing checking of the IC design according to the NOCV ETM 210 and the OCV ETM 220. In detail, the timing analysis module 340 may load the NOCV ETM 210 and the OCV ETM 220 into the APR tool to perform the static timing analysis process.

In order to make the static timing analysis process to be more complete, in the present embodiment, margin variation factors related to the on-chip variation (i.e., the gate delay margin factor, the signal setup margin factor and the signal hold margin factor) can be loaded to the APR tool, such that these factors can be considered during the static timing analysis process.

In summary, a plurality of the ETMs corresponding to a plurality of operating modes in a single digital circuit design are integrated to form two special ETMs (i.e. the NOCV ETM and the OCV ETM), and the two ETMs are loaded to the APR tool for subsequent static timing analysis. Particularly, a setting message of a chip signal is considered in the NOCV ETM, and margin variation factors related to the on-chip variation are not considered in the NOCV ETM, such that the timing arc of each operating mode in the digital circuit design can be completely presented in the static timing analysis of the APR tool through the NOCV ETM and the OCV ETM. In other words, according to the embodiment of the invention, the number of the timing models read by the post end APR tool is greatly decreased, and efficiency of the APR tool in the static timing analysis is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A timing analysis method for a digital circuit design, comprising:
obtaining an integrated circuit design, wherein the integrated circuit design is operated in a plurality of operating modes;
respectively generating a plurality of extracted timing models according to the operating modes of the integrated circuit design, wherein each of the extracted timing models comprises a none on-chip variation part and an on-chip variation part;
integrating the extracted timing models corresponding to the operating modes into a none on-chip variation extracted timing model and an on-chip variation extracted timing model, wherein the on-chip variation part of the operating modes is not considered when the none on-chip variation extracted timing model is generated; and
simulating a timing checking of the integrated circuit design according to the none on-chip variation extracted timing model and the on-chip variation extracted timing model,
wherein the none on-chip variation part comprises a logic gate delay analysis information set and a timing arc verification information set, the on-chip variation part comprises a chip setup derating information and a chip hold derating information,
wherein the logic gate delay analysis information set comprises at least one combinational cell delay message, at least one sequential cell delay message and a pulse width message, and the logic gate delay analysis information set and the timing arc verification information set do not comprise a signal setup margin factor and a signal hold margin factor related to an on-chip variation, and
wherein the integrated circuit design is provided for manufacturing an integrated circuit.

2. The timing analysis method for the digital circuit design as claimed in claim 1, wherein the chip setup derating information comprises a chip setup margin message to consider the on-chip variation, the chip hold derating information set comprises a chip hold margin message to consider the on-chip variation, and the chip setup margin message and the chip hold margin message respectively use different on-chip variation derating factors to implement supplement and derating of the on-chip variation.

3. The timing analysis method for the digital circuit design as claimed in claim 1, wherein the step of respectively generating the extracted timing models comprises:
not to consider the chip setup derating information and the chip hold derating information when the none on-chip variation extracted timing model is generated.

4. The timing analysis method for the digital circuit design as claimed in claim 1, wherein the step of respectively generating the extracted timing models comprises:
generating the extracted timing models by adopting a global on-chip variation supplement derating technique.

5. The timing analysis method for the digital circuit design as claimed in claim 1, wherein the step of simulating the timing checking of the integrated circuit design comprises:

loading the none on-chip variation extracted timing model and the on-chip variation extracted timing model to an auto-place-route tool to perform a static timing analysis process.

6. The timing analysis method for the digital circuit design as claimed in claim 5, wherein the step of simulating the timing checking of the integrated circuit design comprises:

loading the signal setup margin factor and the signal hold margin factor related to the on-chip variation to the auto-place-route tool to perform the static timing analysis process.

7. The timing analysis method for the digital circuit design as claimed in claim 1, wherein the extracted timing models are generated by adopting a same library corner.

8. A computer readable storage media, configured to store a computer program, wherein the computer program is loaded to a computer system to execute the timing analysis method for the digital circuit design as claimed in the claim 1.

9. A timing analysis system for a digital circuit design, adapted to a computer device, the timing analysis system comprises:

a transmission module, configured to receive an integrated circuit design, where the integrated circuit design is operated in a plurality of operating modes;

a timing extraction module, configured to respectively generate a plurality of extracted timing models according to the operating modes of the integrated circuit design, wherein each of the extracted timing models comprises a none on-chip variation part and an on-chip variation part;

a timing model integration module, configured to integrate the extracted timing models corresponding to the operating modes into a none on-chip variation extracted timing model and an on-chip variation extracted timing model, wherein the on-chip variation part of the operating modes is not considered when the none on-chip variation extracted timing model is generated; and a timing analysis module, simulating a timing checking of the integrated circuit design according to the none on-chip variation extracted timing model and the on-chip variation extracted timing model, wherein the none on-chip variation part comprises a logic gate delay analysis information set and a timing arc verification information set, the on-chip variation part comprises a chip setup derating information and a chip hold derating information, wherein the logic gate delay analysis information set comprises at least one combinational cell delay message, at least one sequential cell delay message and a pulse width message, and the logic gate delay analysis information set and the timing arc verification information set do not comprise a signal setup margin factor and a signal hold margin factor related to an on-chip variation, and wherein the integrated circuit design is provided for manufacturing an integrated circuit.

10. The timing analysis system for the digital circuit design as claimed in claim 9, wherein the chip setup derating information comprises a chip input setup margin message to consider the on-chip variation, the chip hold derating information set comprises a chip hold margin message to consider the on-chip variation, and the chip input setup margin message and the chip hold margin message respectively use different on-chip variation derating factors.

11. The timing analysis system for the digital circuit design as claimed in claim 9, wherein the timing extraction module does not consider the chip setup derating information and the chip hold derating information when the none on-chip variation extracted timing model is generated.

12. The timing analysis system for the digital circuit design as claimed in claim 9, wherein the timing extraction module adopts a global on-chip variation supplement derating technique to generate the extracted timing models.

13. The timing analysis system for the digital circuit design as claimed in claim 9, wherein the timing analysis module loads the none on-chip variation extracted timing model and the on-chip variation extracted timing model to an auto-place-route tool to perform a static timing analysis process.

14. The timing analysis system for the digital circuit design as claimed in claim 13, wherein the timing analysis module loads the signal setup margin factor and the signal hold margin factor related to the on-chip variation to the auto-place-route tool to perform the static timing analysis process.

15. The timing analysis system for the digital circuit design as claimed in claim 9, wherein the timing extraction module generates the extracted timing models by adopting a same library corner.

* * * * *